Patented Oct. 28, 1952

2,615,801

UNITED STATES PATENT OFFICE 2,615,801

ANTISPROUTING METHODS AND COMPOSITIONS

William Brown, London, and Harold Clark Mellor, Hatch End, England, assignors to Sterling Drug Inc., New York, N. Y., a corporation of Delaware No Drawing. Application January 17, 1951, Serial No. 206,524. In Great Britain March 18, 1947

3 Claims. (Cl. 71—2.3)

The present invention relates to methods and compositions for the treating of potato tubers to prevent or retard sprouting in storage.

The present invention is based on the observation that chlorinated mononitrobenzenes containing at least three chlorine atoms and free from other substituents are effective substances having the surprising property of retarding the growth of sprouts on potato tubers during storage, whereby excessive sprouting and the consequent wasteful consumption of the nutrient potato substance can be checked. These chlorinated nitrobenzenes are of sufficiently low toxicity to human beings to permit the treatment of "ware" potatoes, as well as "seed" potatoes.

According to this invention, therefore, the substantial prevention of sprouting of potato tubers, is effected by applying thereto a composition containing a chlorinated mononitrobenzene having at least three chlorine atoms attached to the benzene nucleus and free from other substituents, as the essential active substance, after they have been lifted from the soil.

The compounds above set forth as essential active ingredients of our anti-sprouting compositions distinguish critically from the corresponding chlorinated dinitrobenzenes, which have little, if any, effect on tuber sprout growth.

Compositions containing the active substances above set forth can advantageously be applied in the form of a dry pulverulent preparation comprising the chlorinated mononitrobenzene in admixture with an inert solid diluent, for example, talcum powder, china clay, or slate powder. Other inorganic powdered materials may be employed. The dry preparation can contain up to twenty percent. by weight of the active substance. Although such dry preparations are generally the most convenient to apply, the invention also includes liquid preparations, such as solutions, emulsions, or dispersions of the active substances in nonphytocidal solvents or dispersion media. The active substances can also be applied in the form of their vapors, for example, by exposing the tubers to the vapors of these substances during storage.

The dry pulverulent preparations can be applied to the potato tubers in any desired manner, for example, by scattering or dusting the preparation onto the tubers by hand or by mechanical means while the tubers are suitably exposed to receive the treatment, for instance, while being tipped from one receptacle into another or while spread out on a conveyor belt.

The proportion by weight of the active substances to be applied to a given weight of tubers is variable, but good results can be obtained with potato tubers with quantities of the active substances ranging, for example, from three to thirty-two ounces per ton of potato tubers. The action of the active substances in retarding the growth of sprouts varies somewhat according to the proportions in which they are applied, and depends also on the time elapsing after the lifting of the tubers before the substances are applied and on the period and method of storage. Thus, the active substances are preferably applied before the breaking of dormancy and the treated tubers should generally be stored for at least about one month in a substantially enclosed space. The tubers are advantageously treated immediately after lifting and before they are subjected to any further handling, which might lead to damage conducive to the development of disease in untreated tubers.

Especially good results are obtained according to the invention by applying to potato tubers a composition comprising essentially as the active substance 2,3,5,6-tetrachloronitrobenzene in combination with a pulverulent inert material such as clay or talc. The amount of the tetrachloronitrobenzene is preferably 2 to 10 percent by weight of the total composition although compositions having 1 to 20 percent of this active ingredient are satisfactory in preventing or retarding sprouting of potato tubers. It has been found that, in the case of tubers treated with 2,3,5,6-tetrachloronitrobenzene six weeks after lifting and stored for four months, nearly all of the tubers were in an unsprouted condition. This increased retardation of sprout development is of considerable importance in the protection of ware potatoes for human consumption, since sprouting can be almost completely suppressed during storage in clamps, without impairing the value of the potatoes as food.

It should be observed that, once the potatoes have been stored, for instance in clamps, in late autumn or early winter, no attention is required until planting time, or, until the potatoes are removed for market. This is in contrast with untreated potatoes stored in a chitting house, where, apart from the capital expense of a well-built structure, there are the precautions to be taken against spells of frosty weather and the need to ensure sufficient illumination for all the chitting trays, a need which is met in practice by rearranging the chitting trays from time to time. Furthermore, there is the risk of aphis infestation spreading virus diseases in the chitting house, which is minimized by the clamp method of storage permissible following our method of treatment.

To illustrate the practice of our invention, the following examples are given:

Example 1

Potato tubers of the three varieties indicated below were dusted in November by means of a powder blower with a pulverulent mixture of 2,3,5,6-tetrachloronitrobenzene and china clay, containing 3 percent of the tetrachloronitrobenzene calculated on the weight of the mixture, at the rate of 5 ounces of the tetrachloronitrobenzene per ton of tubers. The treated tubers and an equal quantity of untreated tubers of each variety were separately stored in straw covered clamps for 5 months. The tubers were then removed from the clamps, and the sprouts greater than 2 inches in length on the treated and untreated tubers were removed and weighed. The results were as follows:

| Variety | Weight of sprouts removed from ½ cwt. of tubers. | |
|---|---|---|
| | Treated tubers | Untreated tubers |
| | Ounces | |
| Arran Pilot | 1 | 3 pounds 12 ounces. |
| Duke of York | 0 | 1 pound 3 ounces. |
| Dunbar Rover | 0 | 2 pounds 8 ounces. |

Other isomeric tetrachloronitrobenzenes, i. e. 2,3,4,6-tetrachloronitrobenzene, can be substituted for 2,3,5,6-tetrachloronitrobenzene used above.

*Example 2*

Scotch seed potato tubers of the variety "Ninetyfold" were dusted in December by means of a powder blower with a pulverulent mixture of 20 parts by weight of pentachloronitrobenzene and 80 parts by weight of talcum powder at the rate of 7 ounces per 168 pounds (12 stone) of tubers. However, this does not represent the quantity actually applied to the tubers as some of the mixture was blown away by air currents. The treated tubers (168 pounds) and the same quantity of untreated tubers were separately stored in two small clamps until the end of the following March, when the clamps were opened. The sprouts greater than 2 inches in length on the treated and untreated tubers were removed and weighed, the weight being 8 pounds in the case of the untreated tubers and 3.5 ounces in the case of the treated tubers. The short sprouts on both the treated and untreated tubers were retained, very few of the sprouts on the untreated tubers being sufficiently short for planting. A considerable amount of Rhizoctonia could be seen on the sprouts of the untreated tubers, while there was very little disease on the treated tubers.

The treated and untreated tubers (with the long sprouts removed) were then planted, and normally "chitted" seed potatoes of the same variety were planted at the same time for comparison. Towards the end of the following June, the crops were lifted, and the following results were obtained:

| | Average weight per row of 70 plants |
|---|---|
| | Pounds |
| Untreated tubers | 66.3 |
| Treated tubers | 75.4 |
| "Chitted" tubers | 80.3 |

*Example 3*

Forty-five stone (630 pounds) of seed potato tubers of the variety "Great Scot" were dusted with ¾ pound of the pulverulent mixture used in Example 2. One clamp was made in the middle of November with these treated tubers and a second clamp was made at the same time with the same quantity of the untreated tubers. The clamps were finally earthed up at the end of November, and opened four months later. The condition of the sprouts was similar to that described in Example 2. The treated and untreated tubers, after removing the long sprouts as described in that example, were planted at the end of March. Liftings were made on the 24th June, 22nd July and 9th September with the following results:

| | Average weight in tons per acre | | |
|---|---|---|---|
| | 24th June | 22nd July | 9th September |
| Untreated tubers | 4.4 | 6.8 | 8.2 |
| Treated tubers | 8.5 | 10.0 | 12.1 |

It will be seen that the beneficial effect of the treatment was considerable and persisted throughout the season.

*Example 4*

Potato tubers of the variety "Arran Pilot," freshly lifted from the soil, were dusted at the rate of 10 pounds per ton of tubers with a pulverulent preparation consisting of a mixture of 10 parts by weight of 2,4,5-trichloronitrobenzene and 90 parts by weight of china clay. The treated tubers and an equal quantity of untreated tubers were stored in sealed jars for 6 weeks. At the end of this period the untreated tubers had developed sprouts exceeding ⅛ inch in length, whereas the treated tubers were entirely free from sprouts exceeding that length. The tubers were also examined for dry rot, and the percentage of tubers showing this disease amounted to 16 percent in the case of the treated tubers and 28 percent in the case of the untreated tubers.

Satisfactory antisprouting results were obtained when the active ingredient, 2,4,5-trichloronitrobenzene, of the above composition was replaced by other isomeric trichloronitrobenzenes such as 2,3,5-trichloronitrobenzene, 2,4,6-trichloronitrobenzene and 3,4,5-trichloronitrobenzene.

It is apparent from the foregoing that we have provided a novel composition for and a method of treating tubers which enables increased yields to be obtained from seed tubers while decreasing the storage problem with relation thereto. Our invention also facilitates the storage of ware potatoes with a substantial reduction in shrinkage loss due to sprout growth.

This application is a continuation-in-part of our copending application Serial Number 15,046, filed March 15, 1948, now abandoned.

We claim:

1. The method for the substantial prevention of the sprouting of potato tubers which comprises applying to the tubers a composition comprising as its essential active ingredient a chlorinated mononitrobenzene having at least three chlorine atoms attached to the benzene nucleus and free from other substituents in amount exceeding about three ounces of said active ingredient per ton of tubers.

2. The method for the substantial prevention of the sprouting of potato tubers which comprises applying to the tubers a composition comprising as its essential active ingredient 2,3,5,6-tetrachloronitrobenzene in amount exceeding about three ounces of said active ingredient per ton of tubers.

3. A pulverulent antisprouting composition comprising as the active ingredient from 1 to 20 percent by weight of 2,3,5,6-tetrachloronitrobenzene in combination with an inert pulverulent diluent.

WILLIAM BROWN.
HAROLD CLARK MELLOR.

REFERENCES CITED

The following references are of record in the file of this patent:

Brown, Annals of Applied Biology, vol. 34 (1947), pgs. 422 to 429.

Chemical Abstracts, vol. 29 (1945), Col. 6884—abstract of article by Qvist et al.